United States Patent
Tsunoda et al.

(10) Patent No.: US 6,173,342 B1
(45) Date of Patent: Jan. 9, 2001

(54) HIGH SPEED BUS INTERFACE FOR PERIPHERAL DEVICES

(75) Inventors: Motoyasu Tsunoda, Santa Clara; Tatsuo Yamamoto, San Mateo, both of CA (US)

(73) Assignee: Hitachi Semiconductor America, Inc., San Jose, CA (US)

(*) Notice: Under 35 U.S.C. 154(b), the term of this patent shall be extended for 0 days.

(21) Appl. No.: 09/174,822

(22) Filed: Oct. 19, 1998

(51) Int. Cl.[7] .................................................. G06F 13/00
(52) U.S. Cl. ............................................................. 710/8
(58) Field of Search ............................. 710/1–14, 72–74, 710/129–131; 712/28–32, 38; 714/27, 55; 365/63; 370/448

(56) References Cited

U.S. PATENT DOCUMENTS

| | | | |
|---|---|---|---|
| D. 337,305 | | 7/1993 | Ross et al. .......................... D13/133 |
| 4,881,169 | * | 11/1989 | Tanaka et al. ........................ 714/55 |
| 5,052,029 | | 9/1991 | James et al. ......................... 375/107 |
| 5,362,249 | | 11/1994 | Carter ................................... 439/357 |
| 5,384,769 | | 1/1995 | Wick ..................................... 428/141 |
| 5,384,789 | | 1/1995 | Tomita ................................ 371/40.1 |
| 5,394,556 | | 2/1995 | Oprescu ............................... 395/800 |
| 5,509,126 | | 4/1996 | Oprescu et al. ...................... 395/307 |
| 5,638,386 | | 6/1997 | Tsunoda et al. .................... 371/40.1 |
| 5,802,270 | * | 9/1998 | Ko et al. ................................ 714/27 |
| 5,862,389 | * | 1/1999 | Kardach et al. ...................... 395/739 |
| 5,925,133 | * | 7/1999 | Buxton et al. ....................... 713/323 |
| 5,930,523 | * | 7/1999 | Kawasaki et al. ..................... 712/32 |
| 6,052,380 | * | 4/2000 | Bell ...................................... 370/445 |
| 6,064,585 | * | 5/2000 | Mori et al. ............................. 365/63 |

FOREIGN PATENT DOCUMENTS 0 458 648 A2    5/1991  (EP) ................................ H04L/1/00

406187314A    *  7/1994  (JP).

OTHER PUBLICATIONS

IEEE 1394–1995 Triple–Cable Transceiver/Arbiter TSB21LV03A, published by Texas Instruments, SLLS278–Nov. 1997, pp. 1–25.

Integrated ATA Drive Electronics CL–SH8665 Preliminary Product Bulletin, published by Cirrus Logic, Jun. 1998, 4 pages.

IEEE 1394–1995 General–Purpose Link–Layer Controller TSB12LV31 Data Manual, published by Texas Instruments, SLLS278–Nov. 1996, 85 pages.

U.S. application No. 08/004,431, Apple Computer, Inc.
U.S. application No. 07/994,117, Apple Computer, Inc.
U.S. application No. 07/994,983, Apple Computer, Inc.
U.S. application No. 08/005,364, Apple Computer, Inc.
U.S. application No. 08/033,119, Apple Computer, Inc.

* cited by examiner

Primary Examiner—Christopher B. Shin
(74) Attorney, Agent, or Firm—Squire, Sanders & Dempsey, L.L.P.

(57) ABSTRACT

A computer is coupled via a bus to a peripheral device. The peripheral device includes an I/O device portion placed on a single microchip coupled to a process device portion. The I/O device portion includes a physical layer in communication with the computer, and a data channel processor in communication with peripheral device. A single oscillator controls the speed of both of these components, and each component includes a dedicated frequency divider. The process device portion may be hardware, software or hardware and software, and may be implemented on a single chip or on multiple chips. To reduce pin count, interface controllers may be used to communicate between the I/O device portion and the process device portion across a single channel.

30 Claims, 6 Drawing Sheets

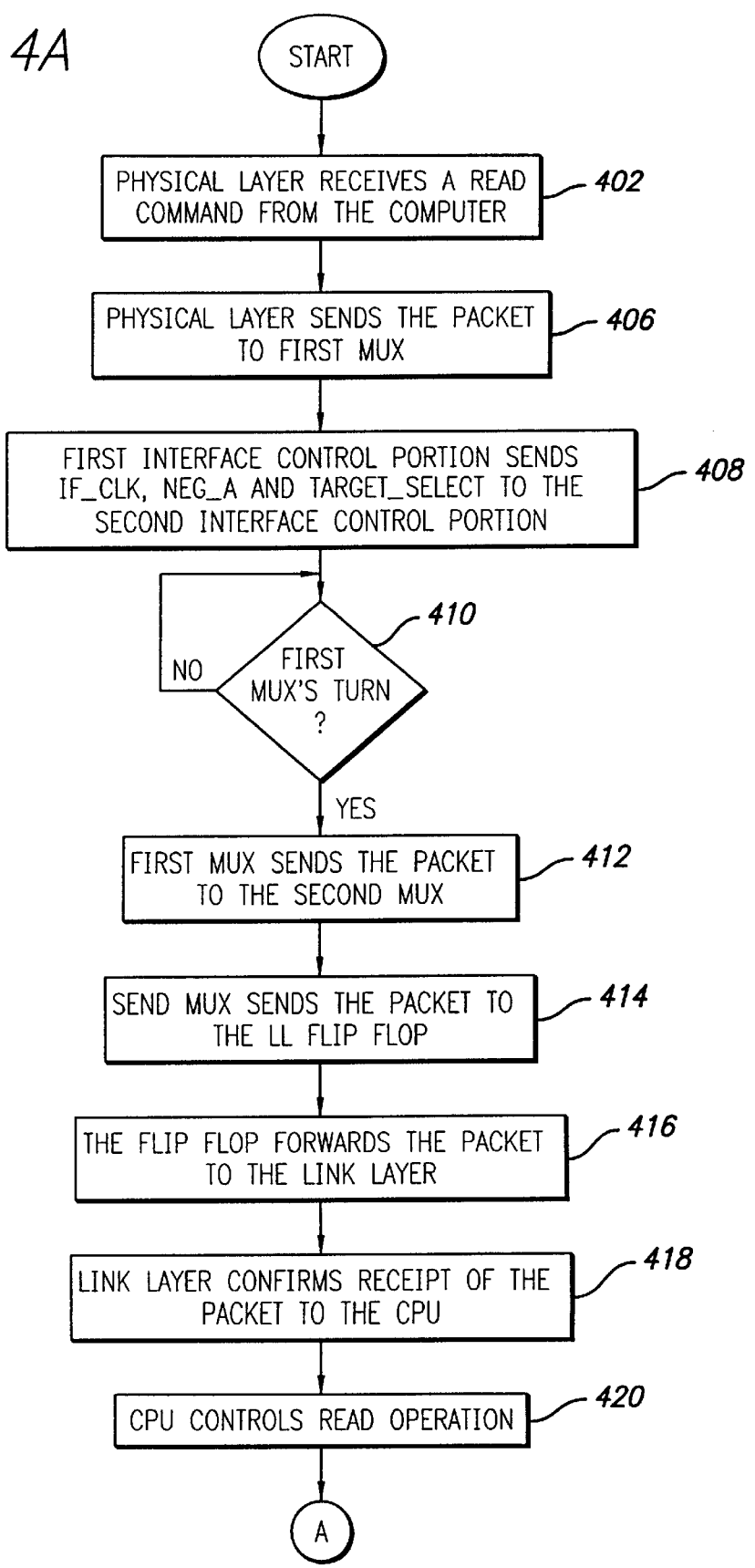

HIGH SPEED BUS INTERFACE FOR PERIPHERAL DEVICES

BACKGROUND OF THE INVENTION

1. Field of the Invention

This invention relates generally to peripheral devices, and more particularly provides a high speed bus interface for peripheral devices.

2. Description of the Background Art

Computers would be useless without peripheral devices such as hard disk drives, digital video disks, printers, etc. A peripheral device interface is needed to enable signal communication between a peripheral device and an attached computer. For example, FIG. 1 illustrates a prior art hard disk drive 104, which includes a hard disk drive interface, coupled to a computer 102. The hard disk drive 104 comprises a physical layer 106 which acts as the host interface with the computer 102, and is coupled via a bus 103 (such as an IEEE 1394 bus or a Fiber Channel bus) to the computer 102. The physical layer 106 includes an address decoder 140 for accessing registers in the physical layer.

The hard disk drive 104 further includes a hard disk controller 108, which controls the communication of data between the physical layer 106 and the hard disk 126. The hard disk controller 108 includes a link layer 110, a buffer manager 114 and a disk formatter 116. The link layer 110 performs data packeting services, and is coupled between the physical layer 106 and the buffer manager 114. The buffer manager 114 controls the temporary storage and retrieval of data to and from a data buffer 118 (such as DRAM). The disk formatter 116 performs ID searches and error correction services, and keeps track of available tracks and sectors on the hard disk 126.

The hard disk drive 104 further includes a data channel processor 128, which controls the signal processing operations of the hard disk 126, and is coupled to the disk formatter 116 and to a motion controller 122. As is well known, the hard disk 126 includes a spindle motor (SPM) 142 for controlling disk rotation and a VCM 141 for controlling movement of the hard disk drive actuator arm (not shown). To control the SPM 142, the CPU 120 controls the rotation via the motor driver 124. To control the VCM 141, the motion controller 122 receives offset signals via the data channel processor 128 from the actuator read/write head (not shown). These offset signals indicate the positioning gap between the read/write head and the center of the track.

The data channel processor 128 writes data to the hard disk 126 by transmitting a write signal to the read/write head via a read/write amplifier 143. Similarly, the data channel processor 128 reads data from the hard disk 126 by recognizing the data signal at the actuator read/write head via the read/write amplifier 143. An address decoder 132 in the data channel processor 128 is used to enable access to registers (not shown) in the data channel processor 128. A central processing unit (CPU) 120 is coupled to the hard disk controller 108 elements, to the data channel processor 128 and to the motion controller 122, for enabling the read and write operations between the computer 102 and the hard disk 126.

To maintain efficient flow of operations, dedicated clocks control the frequency of operations of the physical layer 106, of the data channel processor 128 and of the central processing unit 120. That is, a first oscillator (osc1) 134 clocks the frequency of the CPU 120. A second oscillator (OSC2) 136 and divider (1/x) 144 clock the frequency of the physical layer 106. It will be appreciated that the physical layer 106 preferably is clocked to a standard 24.576 MHz frequency. A third oscillator (osc3) 138 and divider (n/m) 130 clock the frequency of the data channel processor 128. It will be further appreciated that the data channel processor frequency is preferably within preset tolerances, which may be based on the speed of the data to be transferred to/from the hard disk 126 and set by the disk drive manufacturer.

Because the physical layer 106 is integrated separately, the hard disk drive 104 is more expensive to manufacture, consumes more power, and occupies more space on a printed circuit board than the system of the present invention described below with reference to the detailed description. Further, integrating the physical layer 106 and link layer 110 together would compromise valuable life cycle of the link layer 110, since the link layer 110 typically lasts longer than the physical layer 106. Still further, because analog and digital circuits must have isolated grounds, it would be difficult to integrate the physical layer 106, which uses mixed digital and analog signals, with the link layer 110 or buffer manager 114. Even further, each of the physical layer 106 and data channel processor 128 needs an oscillator to generate a variable reference clock, which increases cost, compromises power efficiency, makes the circuit layout more complex, and adds additional wires to the printed circuit board. Accordingly, a system and method are needed to reduce circuit cost, power use and occupied printed circuit board space.

SUMMARY OF THE INVENTION

A computer is coupled via a bus to a peripheral device. The peripheral device includes an I/O device portion placed on a single microchip coupled to a process device portion. The I/O device portion includes a physical layer in communication with the computer, and a data channel processor in communication with peripheral device. A single oscillator controls the speed of both components, and each component includes a dedicated frequency divider. The process device portion may be hardware, software or hardware and software, and may be implemented on a single chip or on multiple chips. To reduce pin count, interface controllers may be used to communicate between the I/O device portion and the process device portion across a single channel.

It will be appreciated that the physical layer and data channel processor are considered "I/O devices" because they perform input/output services. Because the other elements merely act as internal processors, the other elements are termed "process devices." I/O devices typically do not last as long as process devices, and thus typically must be replaced more often. Because the I/O devices are placed on a single microchip, they can be replaced more conveniently and without discarding process devices unnecessarily. Because the physical layer and the data channel processor are on the same chip, a single oscillator, preferably clocked at 24.576 MHz, can control the speed of both of these components. Since these components may operate at different frequencies, each component may include a dedicated frequency divider.

For a disk drive peripheral device, the data channel processor controls a motion controller, which controls a motor driver, which in turn controls the spindle motor (SPM) and VCM. The process device portion contains process devices including a link layer, a disk formatter and a buffer manager. The link layer performs data packeting services, and is coupled to the physical layer optionally via an interface controller (I/F CNTL) located within the hard disk controller device portion and via an interface controller (I/F CNTL) located within the I/O device portion. The link layer is further coupled to the buffer manager, which controls the temporary storage and retrieval of data to and from a data buffer (such as DRAM). The disk formatter performs ID searches and error correction services, and keeps track of available tracks and sectors on the hard disk. The disk formatter is coupled to the data channel processor, and is coupled optionally via the interface controllers to the physical layer and to the data channel processor.

In a first claimed embodiment, a peripheral device interface comprises a microchip embodying a physical layer and a data channel processor, and a process controller coupled to the single microchip for controlling peripheral device operations. In a second claimed embodiment, a method of manufacturing a peripheral device interface comprises the steps of embodying a physical layer and a data channel processor on a single microchip, and coupling a process controller for controlling peripheral device operations to the single microchip

BRIEF DESCRIPTION OF THE DRAWINGS

FIGS. 4A–4C are a flowchart illustrating a method of performing a read operation.

DETAILED DESCRIPTION OF THE PREFERRED EMBODIMENT

Figure 2:
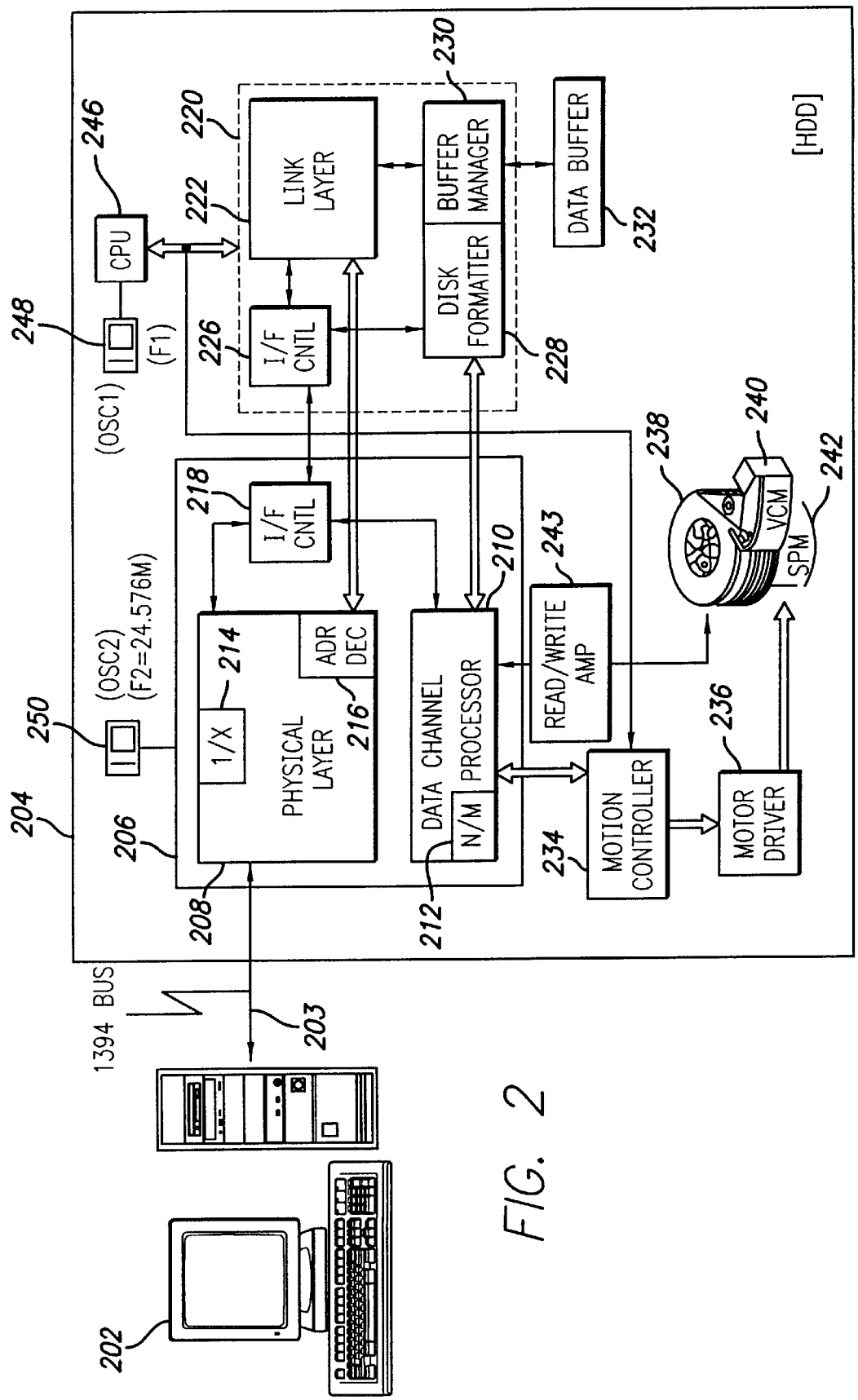
FIG. 2 is a block diagram illustrating a hard disk drive coupled to a computer in accordance with the present invention.

FIG. 2 is a block diagram illustrating a computer 202 coupled via a bus 203 (such as an IEEE 1394 bus or a Fiber Channel bus) to a hard disk drive 204, in accordance with the present invention. It will be appreciated that triangular arrowheads are being used herein to indicate data flow, and flared arrowheads are being used herein to indicate control flow. It will be appreciated that the bus 203 may be serial or parallel.

The hard disk drive 204 includes an I/O device portion 206 coupled to a process device portion 220. It will be appreciated that the physical layer 208 and data channel processor 210 are considered "I/O devices" because they perform input/output services. Because the other elements merely act as internal processors, the other elements are termed "process devices." I/O devices typically do not last as long as process devices, and thus typically must be replaced more often. Because the I/O devices are placed on a single microchip, they can be replaced more conveniently and without discarding process devices unnecessarily.

Figure 1:
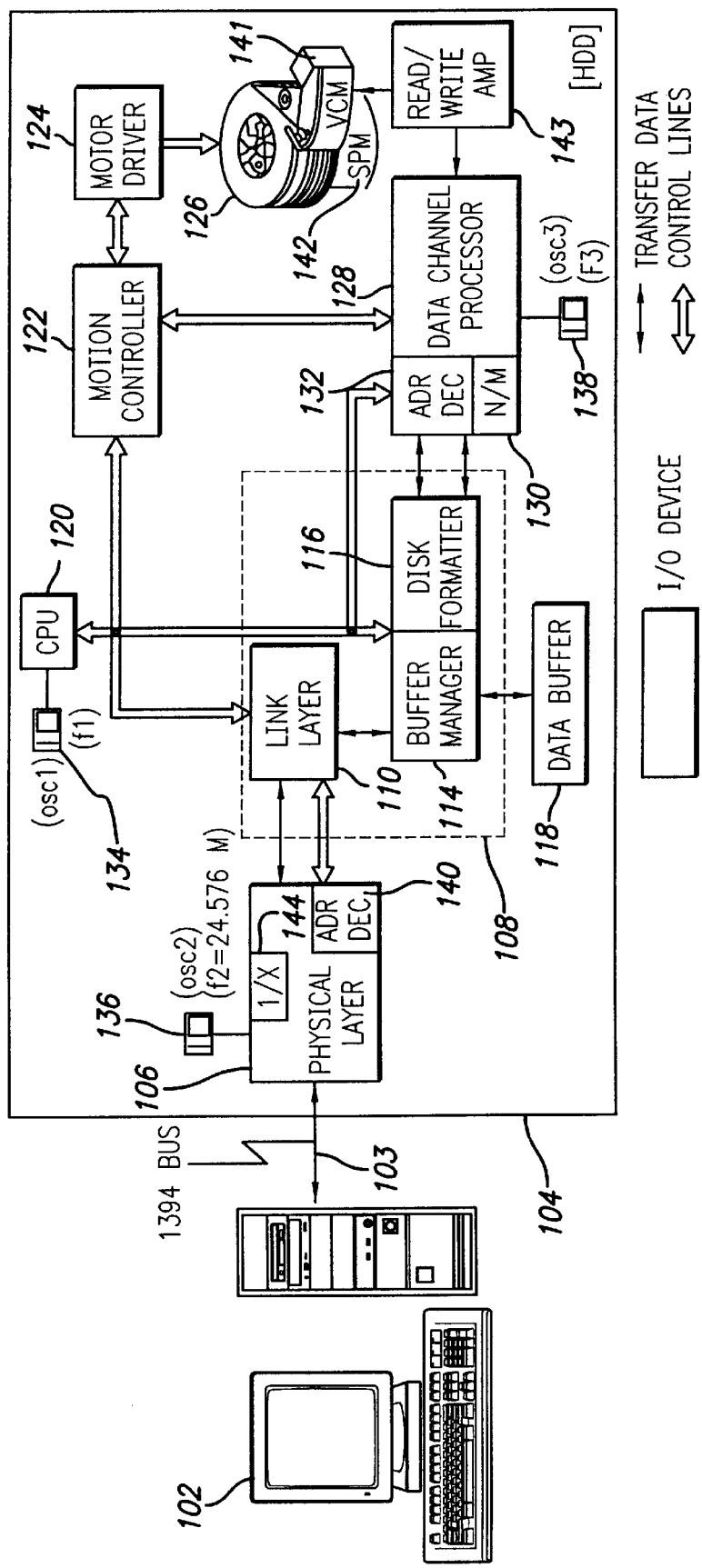
FIG. 1 is a block diagram illustrating a prior art hard disk drive coupled to a computer.

The I/O device portion 206 includes a physical layer 208 in communication with the computer 202 and a data channel processor 210 in communication with a disk drive 238, the physical layer 208 and the data channel processor 210 being fabricated on the same chip. Because the physical layer 208 and the data channel processor 210 are on the same chip, a single oscillator 250, preferably clocked at 24.576 MHz, can control the speed of both of these components. Since these components may operate at different frequencies, each component may include a dedicated frequency divider. In the embodiment shown, the physical layer 208 includes a first divider 214 that modifies the oscillation frequency of oscillator 250 by the function 1/x and the data channel processor 210 includes a second divider 212 that modifies the oscillation frequency of oscillator 250 by the function n'/m'. Using these dividers, the physical layer 208 and data channel processor 210 can be clocked at the same or different frequencies. It will be appreciated that, since the clock frequency of the common oscillator 250 attached to the data channel processor 210 may be different than the frequency of the prior art oscillator 138 (FIG. 1) attached to the prior data channel processor 128, the second divider 212 (n'/m') may be different than the prior art second divider 130 (n/m).

The physical layer 208 acts as the host interface via the bus 203 to the computer 202 and includes an address decoder 216 which is used to enable the CPU 246 to access registers in the data channel processor 210 and in the physical layer 208 via link layer 222. The data channel processor 210 controls a motion controller 234, which controls a motor driver 236, which in turn controls the spindle motor (SPM) 242 and the VCM 240.

The process device portion 220 contains process devices including a link layer 222, a disk formatter 228 and a buffer manager 230. The process devices may be hardware, software or hardware and software, and may be implemented on a single chip or on multiple chips. The link layer 222 performs data packeting services, and is coupled to the physical layer 208 via an interface controller (I/F CNTL) 226 located within the hard disk controller device portion 220 and via an interface controller (I/F CNTL) 218 located within the I/O device portion 206. Using interface controllers 226 and 218 to communicate between the I/O device portion 206 and the process device portion 220 is discussed below with reference to FIG. 3.

The link layer 222 is further coupled to the buffer manager 230, which controls the temporary storage and retrieval of data to and from a data buffer 232 (such as DRAM). The disk formatter 228 performs ID searches and error correction services, and keeps track of available tracks and sectors on the hard disk 238. The disk formatter 228 is coupled to the data channel processor 210, and is coupled via the interface controllers 226 and 218 to the physical layer 208 and to the data channel processor 210.

A central processing unit (CPU) 246 is coupled to the process control portion 220 and to the motion controller 234 for enabling the components to perform read and write operations. Another oscillator (osc1) 248 clocks the frequency of the central processing unit 246. It will be appreciated that, to enable READ and WRITE operations on the disk drive 238, a READ/WRITE amplifier 243 is coupled between the hard disk 238 and the data channel processor 210.

Figure 3:
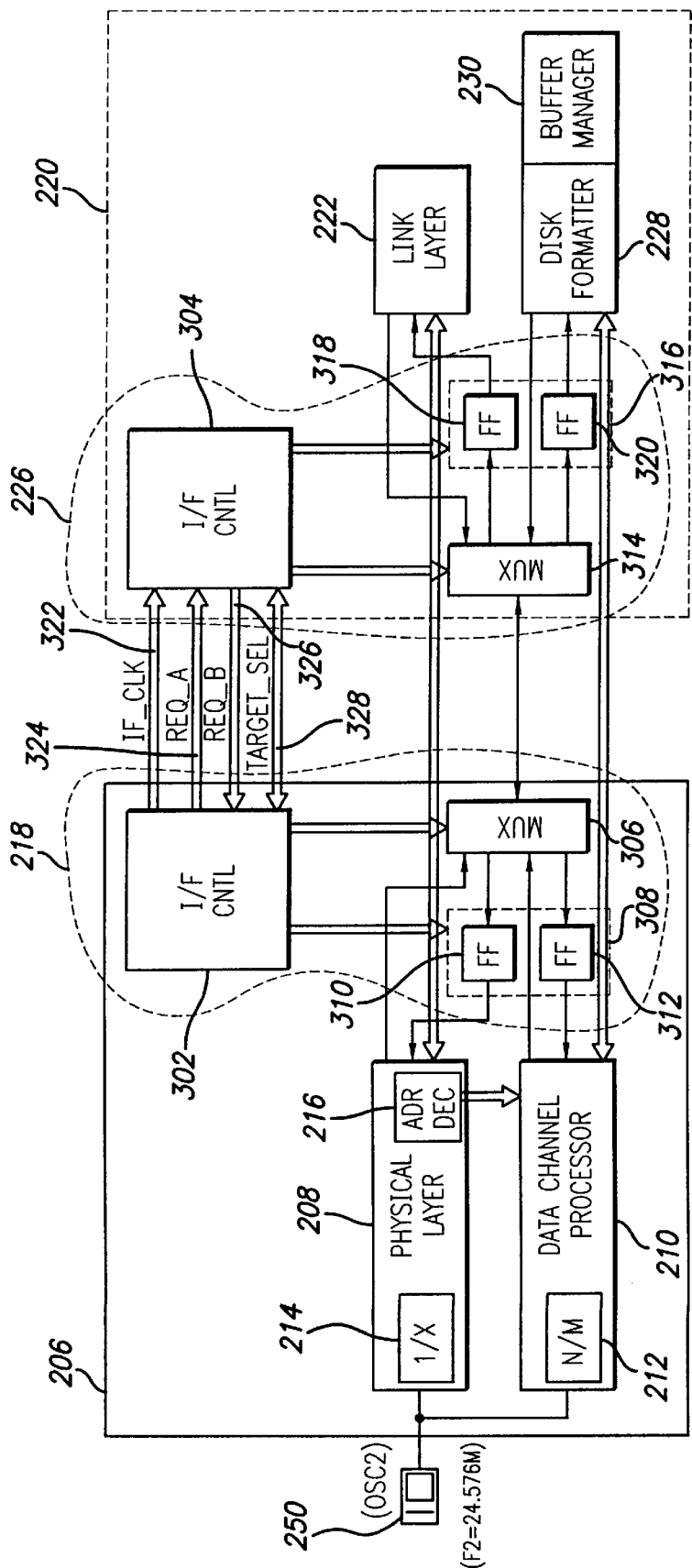
FIG. 3 is a block diagram illustrating the I/O devices coupled to the hard disk controller in accordance with the present invention.

To reduce pin count, the I/O device portion 206 communicates with the process device portion 220 via interface controllers 218 and 226. FIG. 3 is a block diagram illustrating details of the interface controller 218 of the I/O device portion 206 and of the interface controller 226 of the process device portion 220. As illustrated, the interface controller 218 includes an interface control portion (I/F CNTL portion) 302 coupled to a first bi-directional multiplexer (MUX) 306 and to flip-flops (FF) 310 and 312. Interface controller 226 includes an interface control portion (I/F CNTL portion) 304 coupled to a second bi-directional multiplexer (MUX) 314 and to flip-flops (FF) 318 and 320.

Multiplexer 306 receives input data from the physical layer 208, from the data channel processor 210 and from the multiplexer 314 of interface controller 226. Multiplexer 306 forwards output data to flip-flop 310, to flip-flop 312 and to the multiplexer 314 of the interface controller 226. The output of flip-flop 310 is coupled to the physical layer 208, and the output of flip-flop 312 is coupled to the data channel processor 210. The interface control portion 302 selects the input port and the output port of multiplexer 306. Similarly, multiplexer 314 receives input data from the link layer 222, from the disk formatter 228 and from the multiplexer 306 of the interface controller 218. Multiplexer 314 forwards output data to flip-flop 318, to flip-flop 320 and to the multiplexer 306 of the interface controller 218. The output of flip-flop 318 is coupled to link layer 222, and the output of flip-flop 320 is coupled to disk formatter 228. The interface portion 304 selects the input port and the output port of multiplexer 314.

Interface control portion 302 sends an interface clock (if_clk) signal on interface clock bus 322 and an arbitration signal (req_a) on bus 324 to interface control portion 304. The interface clock signal is used to create frequency and phase lock between the interface control portions 302 and 304. Interface control portion 304 sends an arbitration signal (req_b) on bus 326 to interface control portion 302. The arbitration signals (req_a and req_b) are used to coordinate communication (i.e., arbitrate) between multiplexer 306 and multiplexer 314. Interface control portion 302 and interface control portion 304 communicate a target select signal (target_sel) signal on bus 328. The target select signal controls which multiplexer is sending the data and which multiplexer is receiving the data. Further, the target select signal indicates which flip-flop at the receiving end is to receive the data.

Read/Write Operation

Figure 4B:
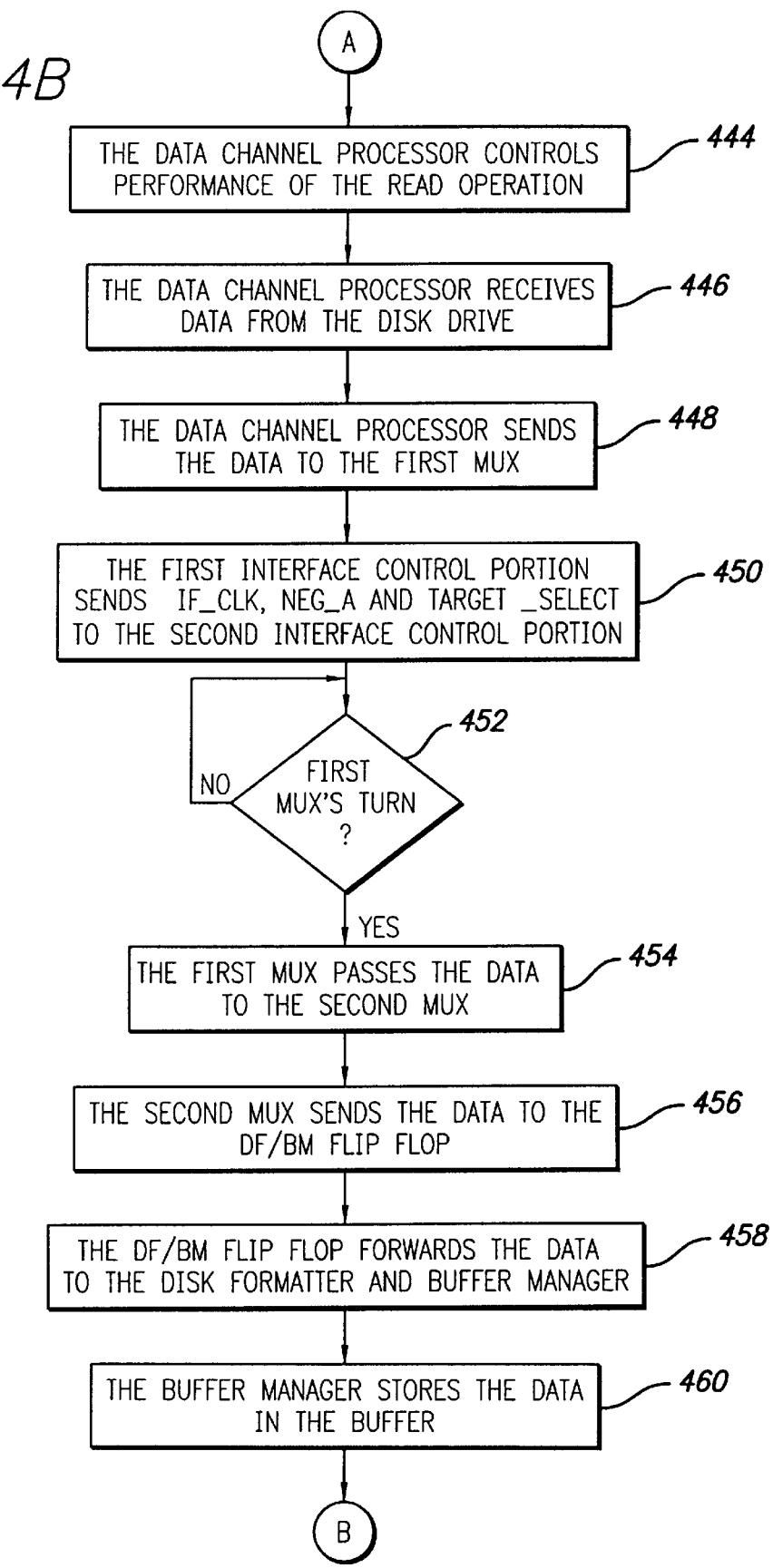
Figure 4C:
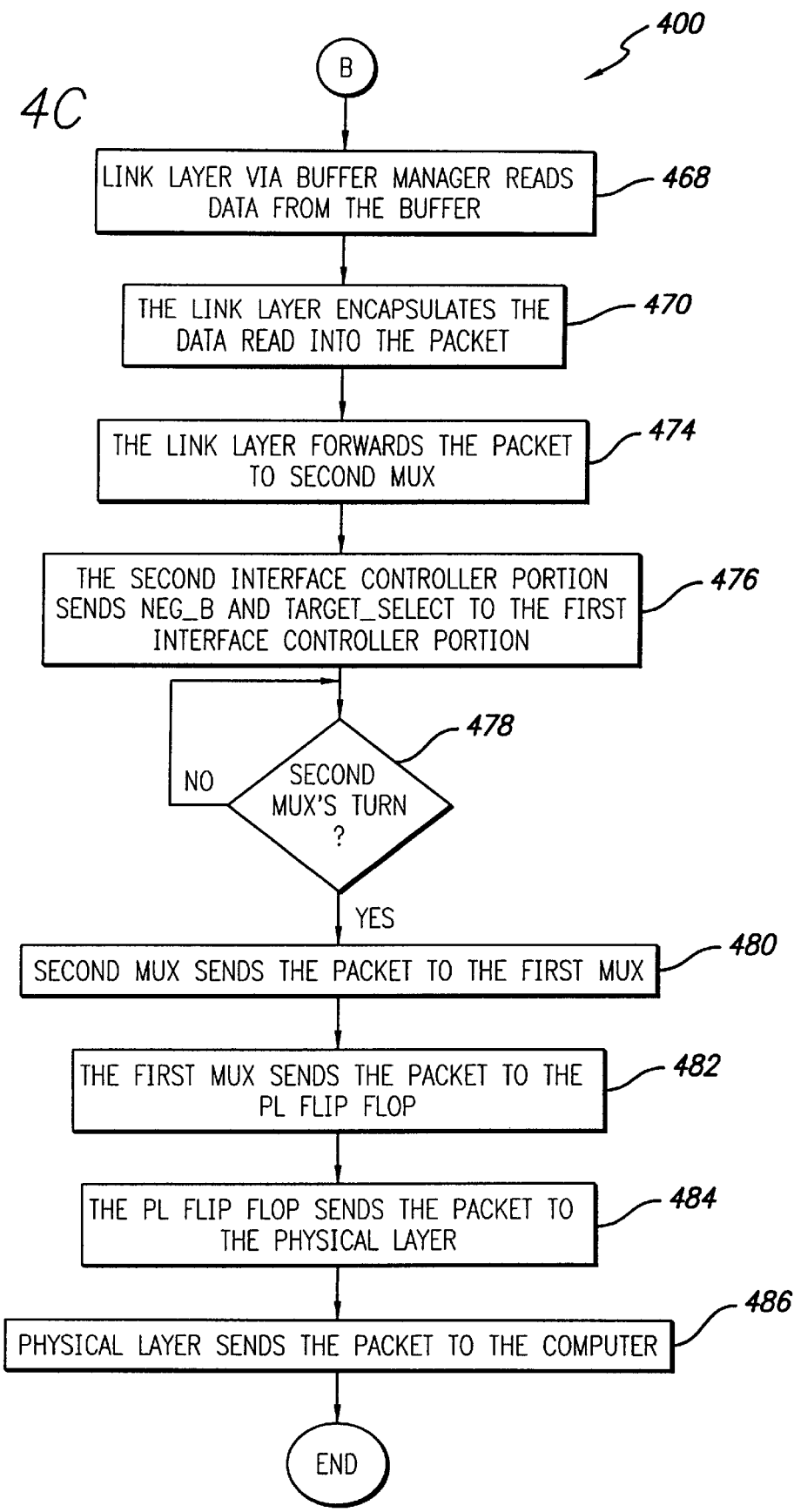

FIGS. 4A–4C are portions of a flowchart illustrating a method 400 of performing a read operation. It will be appreciated that read and write operations are conducted in a similar manner. Thus, by understanding a read operation, one skilled in the art will understand a write operation. Method 400 begins in FIG. 4A with the physical layer 208 in step 402 receiving a packet which includes a READ command from the computer 202. The physical layer 208 in step 406 sends the packet to the first multiplexer (MUX) 306. The first interface control portion 302 in step 408 sends an if_clk signal, a req_a signal and a target_select signal to the second interface control portion 304 for timing purposes, to negotiate a turn and to identify the destination intended, respectively.

In step 410, the interface control portions 302 and 304 determine whether it is the first MUX's 306 turn to pass a signal. If not, then the method 400 returns to step 410 to wait to forward the packet. It will be appreciated that, in this embodiment, the MUXs 306 and 314 include receive lines and send lines. However, the MUXs 306 and 314 may include dual purpose input and output lines, and thus the packet will be stored in the flip flop and forwarded to the respective MUX 306 or 314 when the respective MUX 306 or 314 is available. If the interface control portions 302 and 304 in step 410 determine that it is the first MUX's 306 turn, then the first MUX 306 in step 412 sends the packet to the second MUX 314. The second MUX 314 in step 414 sends the packet to the link layer (LL) flip flop 318. The LL flip flop 318 in step 416 forwards the packet to the link layer 222, which in step 418 interrupts the CPU 246 to confirm receipt of the packet. The CPU 246 in step 420 recognizes the READ command in the packet and controls related portions to read the data requested by the computer 202.

Method 400 continues in FIG. 4B with the data channel processor 210 in step 444 controlling performance of the READ operation. The data channel processor 210 in step 446 receives the data corresponding to the READ command from the disk drive 238, and in step 448 sends the data to the first MUX 306. The first interface control portion 302 in step 450 sends the if_clk, req_a and target_select signals to the second interface control portion 304. In step 452, the interface control portions 302 and 304 determine whether it is the first MUX's 306 turn to send a signal. If not, then method 400 returns to step 452 to wait to send the signal. Otherwise, the first MUX 306 in step 454 passes the data to the second MUX 314. The second MUX 314 in step 456 sends the data to the DF/BM flip flop 320. The DF/BM flip flop 320 in step 458 forwards the data to the disk formatter 228 and buffer manager 230. The buffer manager 230 in step 460 stores the data in the buffer 118.

Method 400 continues in FIG. 4C with the link layer 222 in step 468 reading data from the buffer 118 via the buffer manager 230, and in step 470 encapsulates the data into a packet. The link layer 222 in step 474 forwards the packet to the second MUX 314. The second interface control portion 304 in step 476 sends the req_b and target_select signals to the first interface control portion 306. In step 478, the interface control portions 304 and 306 determine whether it is the second MUX's 314 turn to pass a signal. If not, then method 400 returns to step 478 to wait to send the packet. Otherwise, the second MUX 314 in step 480 sends the packet to the first MUX 306. The first MUX 306 in step 482 sends the packet to the PL flip flop 310. The PL flip flop 310 in step 484 sends the packet to the physical layer 210. The physical layer 210 in step 486 sends the packet to the computer 102. Method 400 then ends.

The foregoing description of the preferred embodiments of the present invention is by way of example only, and other variations and modifications of the above-described embodiments and methods are possible in light of the foregoing teaching. For example, although the invention has been described with reference to a hard disk drive, one skilled in the art will recognize that the invention may be embodied in a digital video disk device, in a video monitor, in a printer device, in a compact disk device, or in any peripheral device having distributed I/O components. The embodiments described herein are not intended to be exhaustive or limiting. The present invention is limited only by the following claims.

What is claimed is:

1. A peripheral device interface, comprising:
   a microchip embodying a physical layer and a data channel processor; and
   a process controller coupled to the single microchip for controlling peripheral device operations.

2. The peripheral device interface of claim 1, further comprising an oscillator coupled to the single microchip.

3. The peripheral device interface of claim 2, further comprising a clock divider coupled between the oscillator and the physical layer.

4. The peripheral device interface of claim 2, further comprising a clock divider coupled between the oscillator and the data channel processor.

5. The peripheral device interface of claim 1, further comprising an address decoder which is used for accessing registers in the data channel processor and in the physical layer.

6. The peripheral device interface of claim 1, wherein the process controller includes a link layer.

7. The peripheral device interface of claim 6, wherein the process controller includes a disk formatter and a buffer manager.

8. The peripheral device interface of claim 1, further comprising an interface controller for establishing communication between the single microchip and the process controller.

9. The peripheral device interface of claim 8, wherein the interface controller includes a first multiplexer coupled to the single microchip, and a second multiplexer coupled to the process controller and via a communications channel to the first multiplexer.

10. The peripheral device interface of claim 9, wherein the interface controller includes control logic for selecting input and output ports of the first multiplexer and of the second multiplexer.

11. The peripheral device interface of claim 10, wherein the control logic includes a first portion for selecting the input and output ports of the first multiplexer and includes a second portion for selecting the input and output ports of the second multiplexer.

12. The peripheral device interface of claim 11, wherein the first portion and the second portion exchange arbitration request signals and destination signals for controlling the selection of input and output ports.

13. The peripheral device interface of claim 11, wherein the first portion sends an interface clock signal to the second portion for enabling frequency and phase lock between the first and second portions.

14. The peripheral device interface of claim 11, wherein the second portion sends an interface clock signal to the first portion for enabling frequency and phase lock between the first and second portions.

15. The peripheral device interface of claim 9, further comprising a first flip flop coupling the first multiplexer to the physical layer, a second flip flop coupling the first multiplexer to the data channel processor, and flip flops coupling the second multiplexer to the process controller.

16. A method of manufacturing a peripheral device interface, comprising the steps of:

embodying a physical layer and a data channel processor on a single microchip; and coupling a process controller for controlling peripheral device operations to the single microchip.

17. The method of claim 16, further comprising coupling an oscillator to the single microchip for controlling the speed of operations of the physical layer and the data channel processor.

18. The method of claim 17, further comprising a clock divider coupled between the oscillator and the physical layer.

19. The method of claim 17, coupling a clock divider between the oscillator and the data channel processor.

20. The method of claim 16, further comprising the step of coupling an address decoder to the data channel processor and to the physical layer to access registers in the data channel processor and in the physical layer.

21. The method of claim 16, wherein the process controller includes a link layer.

22. The method of claim 21, wherein the process controller includes a disk formatter and a buffer manager.

23. The method of claim 16, further comprising the step of coupling an interface controller between the single microchip and the process controller.

24. The method of claim 23, wherein the step of coupling the interface controller includes coupling a first multiplexer to the single microchip, and coupling a second multiplexer to the process controller and via a communications channel to the first multiplexer.

25. The method of claim 24, wherein the step of coupling the interface controller includes coupling control logic for selecting input and output ports to the first multiplexer and to the second multiplexer.

26. The method of claim 25, wherein the step of coupling control logic includes coupling a first portion for selecting input and output ports to the first multiplexer and coupling a second portion for selecting input and output ports to the second multiplexer.

27. The method of claim 26, further comprising the step of coupling the first portion to the second portion for exchanging arbitration request signals and destination signals to control the selection of input and output ports.

28. The method of claim 26, further comprising the step of coupling the first portion to the second portion for sending an interface clock signal to the second portion to enable frequency and phase lock between the first and second portions.

29. The method of claim 26, further comprising the step of coupling the second portion to the first portion for sending an interface clock signal to the first portion to enable frequency and phase lock between the first and second portions.

30. The method of claim 24, further comprising the step of coupling a first flip flop between the first multiplexer and the physical layer, coupling a second flip flop between the first multiplexer and the data channel processor, and coupling flip flops between the second multiplexer and the process controller.

* * * * *